July 23, 1968 W. D. MILLS 3,393,589
STOCK MEASURING DEVICE FOR CONTROLLING STOPPAGE OF PRESS
Filed April 15, 1966 3 Sheets-Sheet 1

INVENTOR.
WILLIAM D. MILLS
BY
*Melvin A. Gerlach*

July 23, 1968 W. D. MILLS 3,393,589
STOCK MEASURING DEVICE FOR CONTROLLING STOPPAGE OF PRESS
Filed April 15, 1966 3 Sheets-Sheet 2
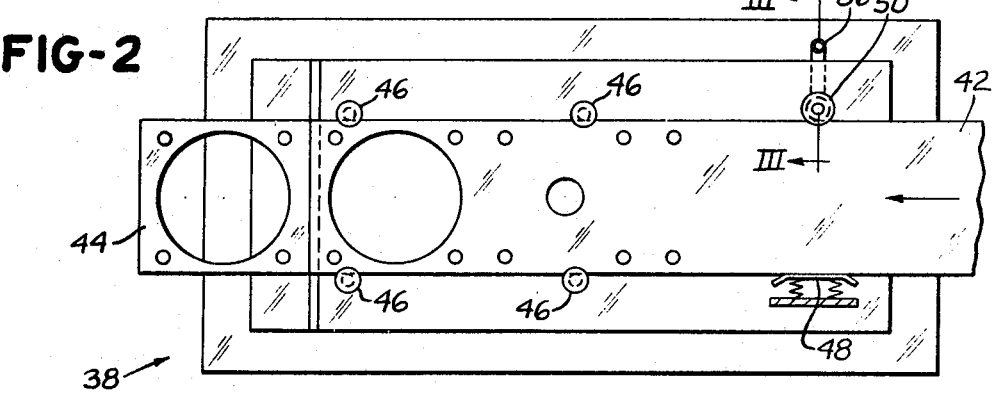
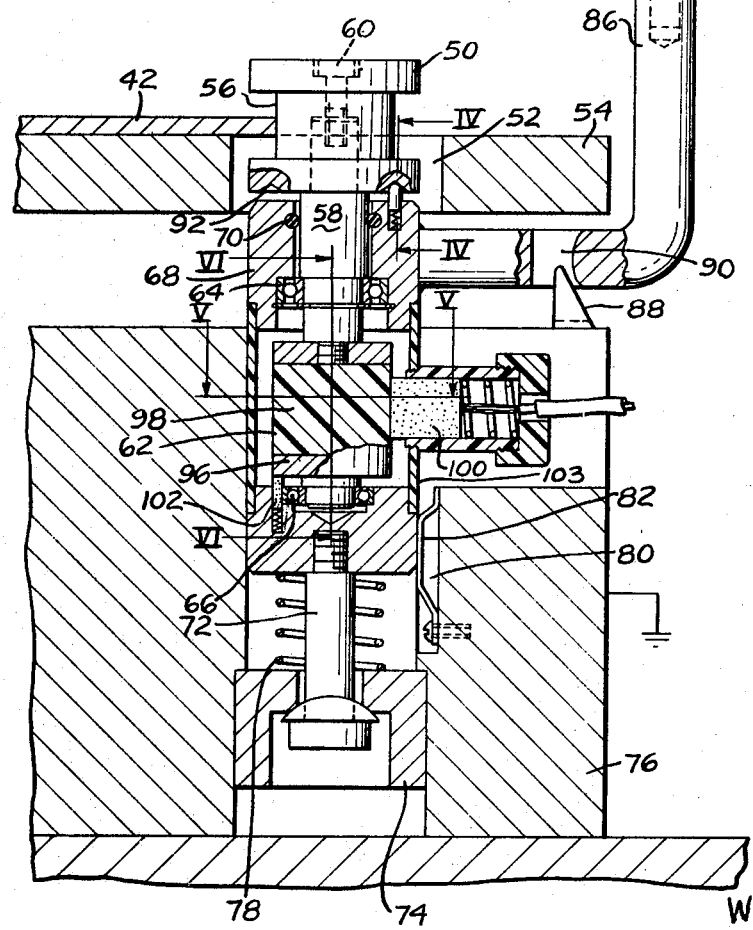
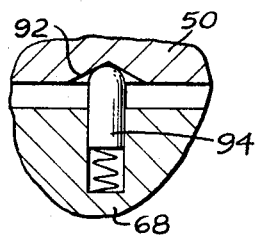
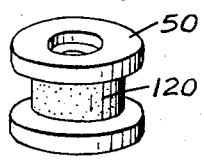
INVENTOR.
WILLIAM D. MILLS
BY

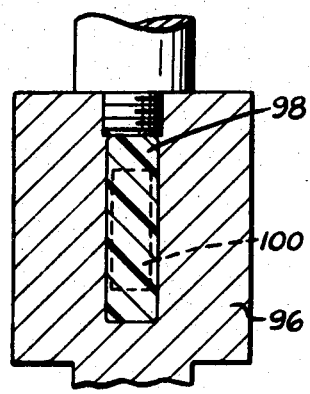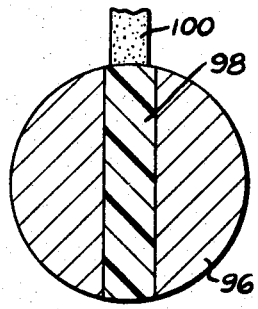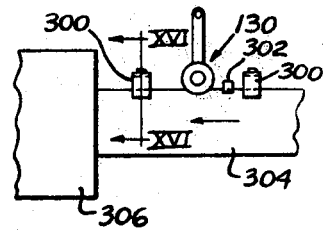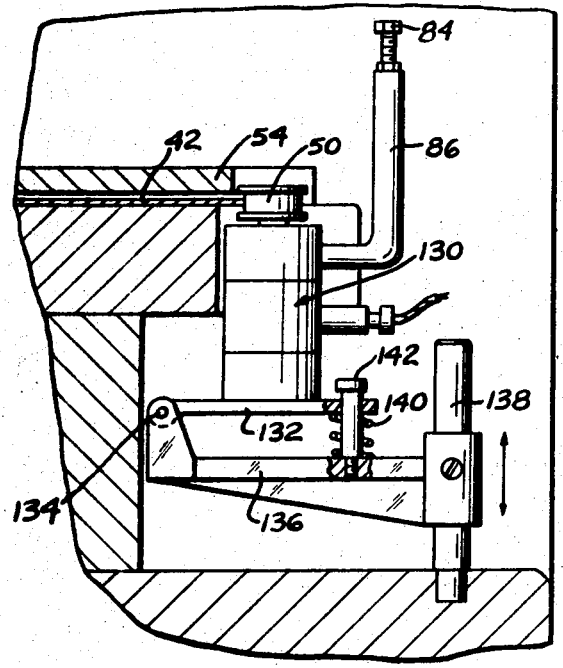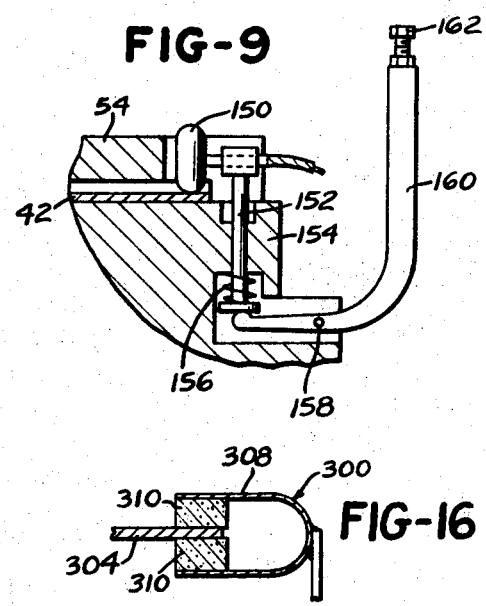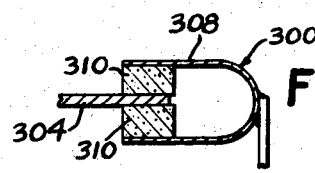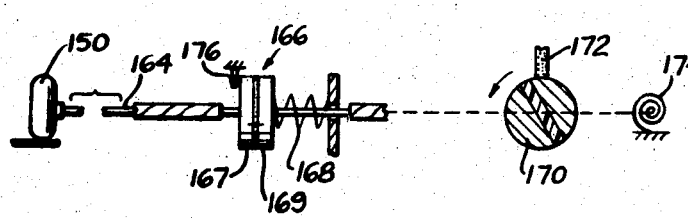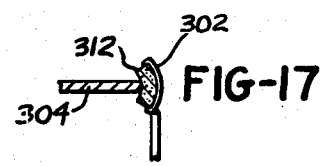

United States Patent Office 3,393,589
Patented July 23, 1968

3,393,589
STOCK MEASURING DEVICE FOR CONTROLLING STOPPAGE OF PRESS
William D. Mills, 130 Kiser Drive,
Tipp City, Ohio 45371
Filed Apr. 15, 1966, Ser. No. 542,792
15 Claims. (Cl. 83—13)

ABSTRACT OF THE DISCLOSURE

Method and apparatus for precisely measuring the advance of stock through a progressive die by using a roller to frictionally engage one edge of the stock for rotation with the advancing stock. Control means senses whether rotation of the roller varies from that desired, and blocks operation of the press if the advance was not within desired tolerances. The advance of the stock can be determined when the press is shut down.

---

This invention relates to control arrangement for metal working presses and the like and is particularly concerned with a control arrangement operable for stopping a press if the stock being fed therethrough does not advance the proper amount on each stroke of the press.

A great deal of metal working is done by passing the stock to be operated, in the form of long strips, through a progressive die and within which die a different part of the total work operation is done in each station of the die. It is, of course, important in connection with such dies to advance the stock exactly the right amount preparatory to each working stroke of the press. Failure to effect the proper advance of the stock will, at the very least, produce scrap from the press and will often cause severe damage to the press or to the die or to both thereof.

Heretofore, attempts have been made to feel the stock by the means of holes or notches formed therein in the die, or to scan the stock photo-electrically to determine the position of a hole formed therein in the die and, in this manner, to ascertain whether or not the stock is advanced the proper amount. None of these arrangements have proved entirely satisfactory in practice. The provision of holes or notches in the stock for feeling purposes requires a more expensive die structure with special means being provided therein to form the holes or notches. Furthermore, the feeler arrangements for feeling the holes and notches, usually limit switches, will sometimes give false indications in which case the device becomes unreliable because stray light may cause a false indication.

With the foregoing in mind, the primary object of the present invention is a provision of an arrangement in which the advance of stock being fed through a progressive die can reliably be determined and the press shut down if the amount of advance of the stock is not within acceptable limits.

Another object of this invention is the provision of a stock feed measuring device which can be built directly into a die as an integral part thereof.

Another object of this invention is the provision of a stock feed measuring device which can be carried in the press separately from the die being operated.

A still further object of this invention is the provision of a stock feed measuring device which is readily adjustable to take into account different amounts of stock feed which obtains for different dies being worked in the press.

Another object of this invention is the provision of a device for measuring stock feeds which can readily be incorporated in existing equipment and connected into the control circuit thereof to control the operation of the press in conformity with the amount of stock feed.

A still further object is the provision of stock feed measuring device of the nature referred to which is relatively inexpensive but which is, at the same time, absolutely reliable for determining the amount of advance of stock through a progressive die in which the stock is being worked.

The foregoing objects, as well as other objects and advantages of the present invention will become more apparent upon reference to the following specification taken in connection with the accompanying drawings, in which:

FIGURE 2 is a somewhat diagrammatic plan view over the lower portion of a progressive die which can be placed in the press of FIGURE 1;

FIGURE 3 is a vertical sectional view indicated by line III—III on FIGURE 2 showing details of construction of the stock measuring device according to the present invention;

FIGURE 4 is a fragmentary sectional view indicated by line IV—IV on FIGURE 3 showing a detail in connection with the measuring device;

FIGURE 5 is a sectional view indicated by line V—V on FIGURE 3;

FIGURE 6 is a sectional view indicated by line VI—VI on FIGURE 3;

FIGURE 7 is a perspective view showing a modification of the measuring roll portion of the stock measuring device;

FIGURE 8 is a somewhat diagrammatic view showing a modified arrangement for supporting the stock measuring device according to the present invention;

FIGURE 9 is a fragmentary view showing a modified form of the stock measuring device;

FIGURE 10 is a somewhat diagrammatic view showing the manner in which the device of FIGURE 9 is integrated with other portions of the stock measuring system;

FIGURES 15, 16, and 17 show a modification.

Figure 1:
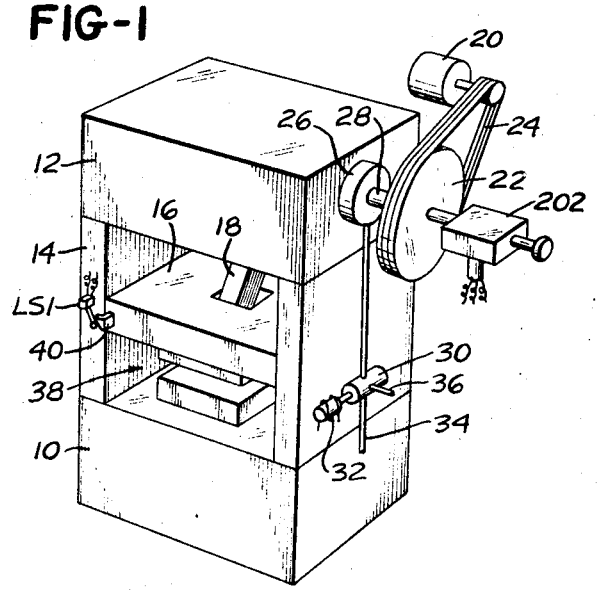
FIGURE 1 is a schematic view of a mechanical press in connection with which the present invention is adapted for being practiced.

Referring to the drawings somewhat more in detail, the press shown in FIGURE 1 consists of bed 10 and a head 12 with the uprights 14 extending therebetween and on which uprights there is guided a platen or slide 16. Slide 16 is adapted for being actuated by one or more connecting rods 18 which extend into the head for connection with the crankshaft of the press. The crankshaft is driven in rotation by a motor 20 which is connected with flywheel 22 by belts 24.

According to well known practices, a pneumatically operated clutch-brake 26 is connected between crankshaft 28 and flywheel 22 and the frame of the press. The clutch-brake is under the control of a valve 30 having an actuating solenoid 32. Valve 30 is provided with air under pressure by a conduit 34 and exhausts spent-air through an exhaust conduit 36. When solenoid 32 is energized, valve 30 shifts to close the clutch portion of the clutch-brake 26 and this will drivingly connect the flywheel 22 with crankshaft 28, thereby rotating the crankshaft and causing reciprocation of slide 16. When solenoid 32 is de-energized, valve 30 will exhaust the clutch portion of the clutch-brake and the brake will become energized and this will connect the crankshaft to the frame of the press and will bring the crankshaft to a halt and thus interrupt reciprocation of slide 16. The general press structure described above is well known in the press art.

The press is adapted to receive therein die means generally indicated in 38 and which, in the practice of the present invention, is in the form of a progressive die. In a progressive die, stock, usually from an elongated stock supply is fed through the progressive die and different work operations are performed on the stock in different stations in the die. The stock is advanced the same amount for each work operation and it is the said advance that the arrangement of the present invention is designed to measure.

Normally, the advancing of the stock through the progressive die commences during the upstroke of slide 16 and is finished by the time the slide 16 is advanced about half way down in its working stroke. With this in mind, a limit switch LS1 is provided which is actuated by a cam 40 on the slide at about the time that the stock feed has been completed. The limit switch is integrated in a control system of a certain type as will be explained hereinafter, in particular, that of FIGURE 12.

Turning now to FIGURE 2, there is shown a plan view of the lower portion of the progressive die means 38. In this figure the stock is indicated at 42 and is advancing leftward through the multiple station die within which various work operations are performed terminating in a cut-off operation at which time the work piece 44 is severed from the strip.

The die may comprise conventional stock lifters 46 distributed therealong which guide and lift the stock during the working of the press. At some place along the stock there may be provided a spring pressed stock crowder 48 and substantially directly opposite thereto is a roller 50 engaging the edge of the stock and which roller forms a part of the feed measuring device of the present invention.

Reference to FIGURE 3 will show that roller 50 may project through a hole 52 in a strip or plate 54 so that the edge of stock 42 will engage the periphery of the roller 50 in the groove 56 thereof. Roller 50 is detachably connected to a shaft 58 by a screw 60. The roller is thus replaceable on the shaft but can be fixed tightly thereto so that it does not rotate on the shaft. Shaft 58 at its lower end is connected with a rotor 62 and anti-friction bearing means 64 and 66 are provided so that the shaft and rotor and the roller 50 mounted on the shaft are extremely free running in the housing 68 of the measuring device. A low friction sealing ring 70 is preferably embodied within the housing near the upper end of the shaft to seal the housing against the entrance of oil or other foreign matter.

The housing 68 of the measuring device at its lower end is connected with a screw 72 which extends through a cup member 74 carried in the body 76 of the lower part of the die. A spring 78 acting between cup member 74 and the lower end of the housing 68 urges the housing upwardly toward its FIGURE 3 position.

It will be observed that the body 76 of the lower die part has a recess 80 therein for receiving the housing 68 of the measuring device, and which recess is elongated in at least one direction so that the housing 68 can tilt therein. A spring 82 in this recess urges the housing 68 toward an upright position and in which position it is shown in FIGURE 3. Upon downward movement of the press slide to carry out a working stroke however, the press slide, or an abutment member carried thereby, will abut the adjustable screw 84 on the upper end of an arm 86 and move the measuring device downwardly to follow the motion of the stock and stripper plate 54 at which time the housing of the measuring device will tilt in recess 80 thereby to separate the measuring wheel 50 from the edge of the stock. During this downward movement of the measuring device a cam 88 mounted on the lower die part may engage the side wall of an aperture 90 in the arm 86 and tilt the measuring device so as positively to separate measuring wheel 50 from the edge of the stock.

The lower side of measuring wheel 50 is provided with one or more fairly shallow conical recess means 92, best seen in FIGURE 4, which are adapted for engagement with a spring pressed detent member 94. The purpose of the recesses and detent member is to provide that, when the measuring wheel 50 separates from the stock, if the amount of stock feed has been within acceptable limits, the measuring wheel will snap into a centered position relative to the detent means and will thus be prepared for another measuring operation.

The aforementioned rotor 62 comprises a metal body 96 having insulating plug means 98 therein. In this connection, reference may be made to FIGURES 5 and 6. The insulating plug means is adapted for cooperation with a brush 100 carried by the insulating central portion 102 of housing 68 and spring biased toward the rotor. The width of the brush and the circumferential extent of the insulating plug member 98 is such that the brush will engage the metal body 96 on one side or the other of the insulating plug unless the amount of feed of the stock is within acceptable limits.

A circuit is completed from the metal body of the plug to the frame of the measuring device via an auxiliary brush 102, if necessary, although, normally, the circuit can be completed directly through the bearings supporting the shaft and rotor.

Figure 12:
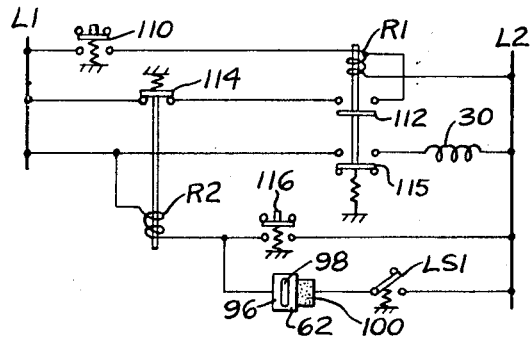
FIGURE 12 is a control circuit in which the measuring devices of FIGURES 3 and 10 could be incorporated.

The aforementioned measuring device may be connected in a control circuit of a press as illustrated in FIG. 12. In FIG. 12 a start switch 110 is provided which, when closed, will energize the coil of the relay R1. Relay R1 is held through a holding circuit made by its own blade 112 and by the normally closed blade 114 of an auxiliary and normally open relay R2. A second blade 115 of relay R1 completes the circuit to the aforementioned valve solenoid 30.

Stopping of the press is accomplished by deenergizing relay R1 which is effected by energizing relay R2 to open its blade 114. Relay R2 is energized by closing of stop switch 116 or by an automatic control (not shown) if the press is to be stopped when the slide reaches its uppermost position, as is usually the case when the press is automated.

According to the present invention rotor 62 is located in a circuit bypassing switch 116. This bypassing circuit includes the normally open switch LS1 which is closed by cam 40 on slide 16 at about the time the feed of the stock is completed. If, at this time, brush 100 is resting on metal portion 96 of the rotor, a circuit will be completed to the coil of relay R2 and relay R2 will be energized and this will deenergize relay R1 and stop the press. If, on the other hand, the amount of feed of the stock has been within acceptable limits, the brush will be resting on one end of insulating plug 98 and no circuit will be completed to the coil of relay R2 and the press will continue to operate.

The wheel 50 will normally not slip on the edge of stock 42 but it is possible to knurl or roughen the surface of in groove 56, if so desired. In FIGURE 7, for example, there is shown a sprayed on coating 120 of a rough material which may, for example, be carbide or the like, so that the engagement of the roll with the stock is substantially slip free, while the roll also has long wearing qualities.

The stock feed measuring device described up to now is adapted for being incorporated directly in the die as an integral part thereof. It is possible also, however, to mount the device separately from the die in the press. This is shown in FIG. 8 wherein the measuring device is indicated generally at 130 and is substantially identical with that shown in FIG. 3. In FIG. 8, the measuring device is mounted on a platform 132 tiltably supported at 134 on a platform 126 which is adjustably carried on post 138 mounted in the frame of the press. The spring 140 biases platform 132 upwardly to cause the roller of the measuring device to engage the edge of the stock to be rotated thereby and a headed shoulder screw 142 is provided so that the tilting movement of platform 132 is limited.

It is also contemplated by the present invention to engage the stock from above as by roller 150 shown in FIG. 9. This roller is mounted on an arm 152 which is vertically moveable in the die 154 against the bias of a spring 156. A lever 158 pivoted at 160 has an upstanding portion with an adjustable screw 162 at the top to be engaged by the slide, or an abutment element thereon, or by the upper portion of the die, so that when the die is closed during a working stroke, arm 154 will be moved upwardly and roller 150 will be separated from the stock.

As will be seen in FIG. 10 roller 150 is connected by the rotatable portion of a flexible drive cable 164 with an adjustable clutch means 166 consisting of parts 167 and 169 which can be angularly adjusted so that the inner portion of the cable 168 leading from the right side of the clutch can be adjusted angularly relative to roller 150. The drive element of cable 168 is connected to rotor 170 which is constructed the same as the rotor described in connection with FIG. 3. This rotor cooperates with the brush 172 and can be connected in a circuit according to FIG. 12 as has been described. The biasing spring 174 is connected to rotor 170 and continuously biases it and the parts connected thereto back to a predetermined starting position. A stop element 176 is provided against which the portion of the adjustable clutch 166 connected to wheel 150 stops.

From the foregoing, it will be seen that the starting position of rotor 170 can be adjusted relative to the starting position of roller 150 by availing of slip or adjustable clutch 166. Thereafter, if a predetermined amount of stock is moved past roller 150 while the roller is in engagement with the stock, rotor 170 will turn to the proper position to cause the press to continue in operation after the stock feed measurement has been detected. As the press continues in operation, during the working stroke of the press, roller 150 will be lifted from the stock and spring 154 will return rotor 170 and roller 150 to the starting position thereof. The arrangement of FIGURES 9 and 10 thus offers the advantage of substantially infinite adjustment of the amount of feed of the stock without changing roller 150 whereas the modification of FIGURE 2 requires that the roller be substantially exactly sized with respect to the circumference thereof in groove 56.

Figure 11:
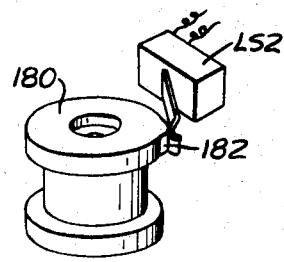
FIGURE 11 is a perspective view showing how the stock measuring wheel of the device of the present invention could be provided with a cam region for actuating a limit switch.

It is also contemplated that the measuring roller can directly operate a control switch. This is shown in FIGURE 11 wherein measuring roller 180 is provided with a cam region 182 adapted for actuating a limit switch LS2 when the roller has turned a predetermined amount. There could be more than one of the cam regions 182 on roller 180 if so desired depending on the die and size of the grooved portion of the roller relative to the amount of stock feed to be measured.

The embodiment of FIGURE 11 is particularly well adapted for use in connection with a press control circuit in which a circuit must be made to continue the press in operation instead of breaking a circuit to continue the press in operation in accordance with the foregoing modification.

Figure 13:
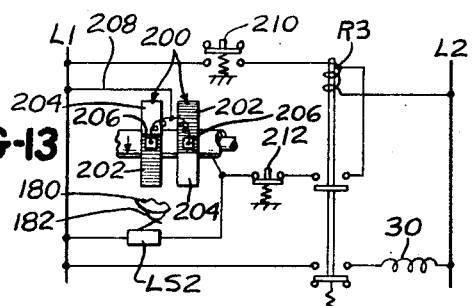
FIGURE 13 shows a control system in which the measuring device of FIGURE 11 could be incorporated.

Such a control circuit is illustrated in FIG. 13. In this figure, a pair of discs 200 are provided which form a part of a control switch assembly 202 which will be seen in FIGURE 1 to be connected with the crankshaft of the press to be rotated thereby. Discs 200 each comprise insulating segments 202 and conductive segments 204, brush means 206 rest on the segments and are interconnected and are also connected with one power line L1. The segments 204 are in turn both connected to a wire 208. Line L1 is connected to wire 208 throughout the rotation of discs 200 except for a small amount of angular movement thereof when both brushes 206 rest on insulating segments 202. The discs 200 are shown in break-circuit position in FIGURE 13. The break-circuit condition occurs only once during the revolution of the shaft of the control switch. Connected in parallel with the circuit portion which includes the discs 200 is limit switch LS2. Limit switch LS2 is adapted for being closed by the cam portion 182 of the measuring roll 180. The discs 200 are adjusted so that the break-circuit position thereof occurs when the stock feed has just been completed and at which time, if the said stock feed is of the proper amount, switch LS2 is closed.

The described arrangement is embodied in a control circuit by utilizing the rotary control switch and limit switch LS2 to maintain the holding circuit to the coil of a relay R3. Relay R3 is energized by closing of start switch 210 and is adapted to be deenergized on the opening of the holding circuit thereof which includes the aforementioned rotary shwitch and switch LS2 in parallel and the said two switches in series with stop switch 212. Relay R3, when, energized, will complete the circuit to valve solenoid 30 in the same manner as relay R1 in FIGURE 12.

Figure 14:
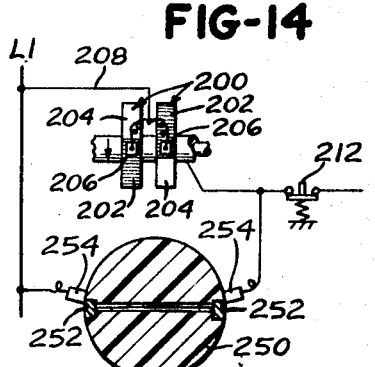
FIGURE 14 is a view showing a portion of a control system similar to that of FIGURE 13 but illustrating a modified construction of the rotor of the measuring device.

The arrangement of the present invention to make a circuit at the instant that the stock feed has been completed can also be accomplished by using a modified rotor and brush arrangement in the structure of FIGURE 3. This is shown schematically in FIGURE 14 wherein the rotor 250 has two conductive contact segments 252 therein arranged diametrically opposite each other and electrically interconnected. Engaging the periphery of rotor 250 are the brushes 254 which are disposed at different angles than the contact segments 252 so that the brushes 254 are interconnected by contact segments 252 for a period of time only slightly longer than the break period of the rotary switch discs 200. The rotor of FIGURE 14 thus accomplishes the same purpose as the limit switch LS2 of FIGURE 13, and, if the amount of feed of the stock is correct, the press will continue to operate.

As is known, if the control circuit of the press is interrupted while the press is, say, one half way through its advancing stroke, the slide of the press can be caused to halt before the die parts carried thereby come together in working relation.

The present invention thus represents a reliable means for measuring the amount of feed of the stock advancing through the progressive die in a press and for utilizing the detected feed for controlling the press; either to cause the press to continue in operation, if the amount of stock feed is correct; or to interrupt operation of the press if the amount of stock feed is incorrect. The device is sensitive only to the amount of feed of the stock and operates equally well if the stock feed is too much or too little. The stock feed must fall within relatively narrow limits for the press to continue in operation when the press is provided with a stock feed measuring device according to the present invention.

While a progressive die has been referred to in the foregoing detailed description, it will be understood that the device of the present invention is useful with other types of dies and the like, such as simple blanking dies, in which stock is fed in strip form through the die.

The device 130 of FIGURE 8 is advantageously mounted outside the range of the die so the roller can engage the edge of the stock.

In FIGURE 15, device 130 is supported in spaced relation to die 306 so the roller of the device can engage the edge of stock 304. To prevent the stock from whipping or vibrating and to generally stabilize it, clampers 300 are provided ahead of and behind device 130. Each clamper 300, as will be seen in FIGURE 16 comprises a spring clip 308 and felt pads 310 which engage the top and bottom of strip 306 to stabilize the strips and wipe the edge thereof. The pads could be lubricated.

A further wiper 302 (FIG. 17) could have a felt pad 312 wiping the edge of the sheet so a clean edge was presented to device 130.

It will be understood that this invention is susceptible to modification in order to adapt it to different usages and conditions; and accordingly, it is desired to comprehend such modifications within this invention as may fall within the scope of the appended claims.

What is claimed is:

1. A stock feed measuring device for measuring the amount of each increment of feed of stock which advances by successive equal feed increments through work station means, said device comprising; a roller frictionally engaging the stock so as to be rotated by the stock during feed movement of the stock, said roller having control element means connected therewith to be driven by the roller when the roller is driven by the stock, circuit means under the control of said control element means, positioning means operable in the interval between successive increments of feed of said stock to effect positioning of at least said control element means in a predetermined initial starting position, means responsive to movement of said control element means from said starting position into a first predetermined position during an increment of feed of said stock for influencing said circuit means in a first manner, and means responsive to movement of said control from said starting position into a second position during an increment of feed of said stock spaced more than a predetermined amount from said first predetermined position for influencing said circuit means in a second manner different from said first manner.

2. A stock feed measuring device according to claim 1 in which said positioning means includes means biasing said control element means toward said starting position, and means operable in the interval between successive feed increments of the stock for effecting operative disengagement of said control element means from driving connection with said stock thereby to release said control element means to the influence of said biasing means.

3. A stock feed measuring device according to claim 1 in which said positioning means includes means biasing said roller toward a certain starting position, and means operable in the interval between successive feed increments of the stock for effecting disengagement of said roller from said stock thereby to release said roller to the influence of said biasing means.

4. A stock feed measuring device according to claim 1 in which said roller engages the side edge of said stock, said roller having recess means therein with inclined approach and exit walls, a spring pressed plunger adapted to enter said recess means, means operable in the interval between successive increments of feed of said stock to disengage said roller from the edge of said stock, said plunger when disposed in said recess means determining the starting position of said roller, the size of said roller being selected so that when the roller is rotated during a feed increment of the stock the plunger means will leave one said recess means and come within the range of the recess means next adjacent said one recess means in the circumferential direction of said roller.

5. A stock feed measuring device according to claim 4 in which said control element means is in the form of a rotor fixed to said roller, said rotor having conductive and nonconductive regions on the periphery thereof and, brush means bearing on the periphery of said rotor, said brush means being connected in said circuit means and making a portion of said circuit means only when said rotor is in said first predetermined position.

6. A stock feed measuring device according to claim 4 in which said control element means is in the form of a rotor fixed to said roller, said rotor having conductive and nonconductive regions on the periphery thereof and, brush means bearing on the periphery of said rotor, said brush means being connected in said circuit means and breaking a portion of said circuit means only when said rotor is in said first predetermined position.

7. In combination; a press having a bed and a slide and first and second parts of a progressive die set on said bed and slide respectively, control means for controlling the reciprocation of said slide including a solenoid having a first condition of energization for causing said slide to stop, said die set being operable on stock advanced therethrough in equal increments of feed each of which is initiated in the interval following the separation of the die parts at the end of one working stroke of the slide and is terminated before the die parts come together during the next working stroke of the slide, a control circuit for said solenoid having a holding branch which is interrupted to effect said second condition of energization of said solenoid and stop said slide, a roller engaging said stock so as to be driven thereby during feed movement of said stock, positioning means operable in the interval between successive increments of feed of said stock for positioning said roller in a predetermined starting position, a control element operated by said press in the interval between the end of a stock feed increment and the subsequent interengagement of said die parts and adapted to cause interruption of said branch, and switch means connected in parallel with said control element and actuated by said roller when the roller moves a distance from said starting position corresponding substantially exactly to an increment of feed of said stock for counteracting the effect of said control element.

8. The combination according to claim 7 in which said roller and switch means are part of a unit mounted in one of said die parts.

9. The combination according to claim 7 in which said roller and switch means are part of a unit mounted in said press separately from said die parts.

10. The combination according to claim 7 in which said switch means is a rotor connected to said roller having conductive and nonconductive portions on the periphery thereof, a housing rotatably supporting said rotor and roller, brush means carried by the housing and engaging the periphery of said rotor, said roller engaging one side edge of said stock, means for tilting said housing during a working stroke of said slide to disengage the roller from the stock, and said positioning means comprising resilient means biasing said roller toward said starting position and effective only when said roller is disengaged from said stock.

11. The combination according to claim 7 in which said switch means is a limit switch, and said roller has cam means connected thereto and arranged to actuate said limit switch.

12. A stock feed measuring device according to claim 5 in which said brush means is a single brush having a dimension in the direction of the circumference of said rotor slightly less than the dimensions of a nonconductive region of the rotor.

13. A stock feed measuring device according to claim 4 in which said brush means is a pair of brushes engaging the rotor at respective regions spaced circumferentially about the rotor, a pair of the conductive regions of the rotor being electrically interconnected and spaced circumferentially of the rotor a distance such that the conductive segments interconnect said brushes for brief intervals only during rotation of said rotor.

14. The method of operating a press having a progressive die therein which comprises; advancing stock to be operated through the die in spaced equal increments of feed which alternate with the working strokes of the press, frictionally engaging the stock with a roller so the roller will rotate as the stock is fed, detecting the position of the roller at the end of an increment of feed, and halting the press if the detected position of the roller is more than a predetermined small amount removed from a predetermined position of the roller corresponding substantially exactly to an increment of feed of the stock.

15. The method according to claim 14 in which said roller is disengaged from the stock following each increment of feed of the stock and is reset to a predetermined starting position prior to the next increment of feed of the stock.

References Cited

UNITED STATES PATENTS

| | | | |
|---|---|---|---|
| 1,783,947 | 12/1930 | Sommer | 192—125 |
| 3,229,556 | 1/1966 | Jensen | 83—66 |

ANDREW R. JUHASZ, *Primary Examiner.*